W. J. YEOELL.
PRINTING PLATE AND METHOD OF MAKING THE SAME.
APPLICATION FILED DEC. 2, 1920.
1,379,432. Patented May 24, 1921.
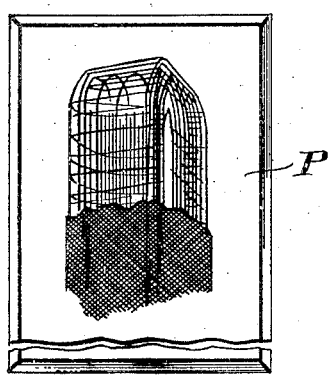
Fig. 1.
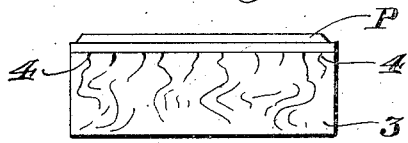
Fig. 2.
Fig. 3.
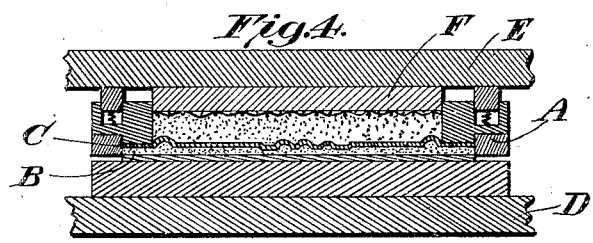
Fig. 4.
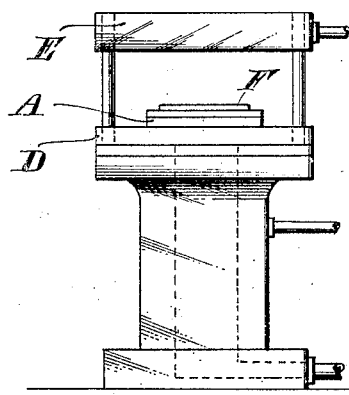
Fig. 5.
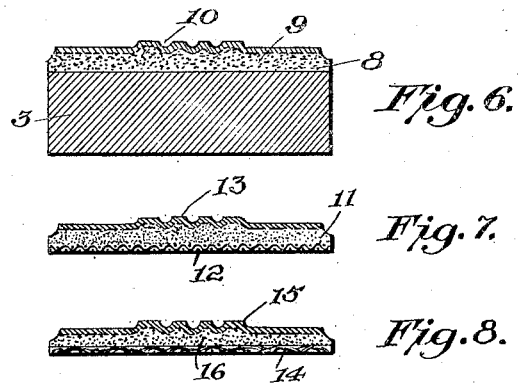
Fig. 6.
Fig. 7.
Fig. 8.
Fig. 9.
Fig. 10.
Inventor
William J. Yeoell
By Meyers, Cavanagh & Hyde
Attorneys

UNITED STATES PATENT OFFICE.

WILLIAM J. YEOELL, OF PHILADELPHIA, PENNSYLVANIA, ASSIGNOR TO JOHN STOGDELL STOKES, OF PHILADELPHIA, PENNSYLVANIA.

PRINTING-PLATE AND METHOD OF MAKING THE SAME.

1,379,432.   Specification of Letters Patent.   Patented May 24, 1921.

Original application filed April 25, 1916, Serial No. 93,493. Divided and this application filed December 2, 1920. Serial No. 427,831.

*To all whom it may concern:*

Be it known that I, WILLIAM J. YEOELL, a citizen of the United States, and resident of Philadelphia, in the county of Philadelphia and State of Pennsylvania, have invented certain new and useful Improvements in Printing-Plates and Methods of Making the Same, of which the following is a specification.

This invention relates to molded printing plates and method of making the same and the present case is a division of my application Serial No. 93,493, filed April 25, 1916, and is also in the nature of an improvement on the printing plate disclosed in my prior application Serial No. 784,456, filed August 12, 1913.

In said earlier application Serial No. 784,456 I set forth the use of a synthetic resinous material, in the nature of phenolic condensation products, in the manufacture of molded printing plates. Therefore, such claims as relate to printing plates and to the method of making the same, and are generic to the present divisional application and to the aforesaid earlier application, Serial No. 784,456, are incorporated in the latter, while the claims herein are directed to improvements on the printing plate originally disclosed in said earlier application Serial No. 784,456.

In carrying out the present invention I make my improved printing plate from a composite structure which includes, as a component part, a synthetic resin in the nature of a phenolic condensation product, such for example, as that commercially termed "redmanol." As is well known, such a phenolic condensation product, when subjected to a predetermined degree of heat, or heat and pressure, will assume a hard and set and substantially infusible form. Consequently my improved printing plate, when made with a phenolic condensation product, as a constituent, will embody the desired features of strength, durability, lightness of weight and resistance to acids and printing pressures and the wear and tear encountered in handling and transportation.

In the preparation of my printing plates I prefer to employ in conjunction with the phenolic condensation product, fillers of various character, as for example such heat conducting substances as powdered metal or metallic oxid, to increase the heat conductivity of the plastic phenolic condensation product, and I also use as strengthening and stiffening materials, fibrous substances such as felt or paper, or I may use fabrics, such as crinoline, coarse linen or the like. These fillers and strengthening sheets may be incorporated in a laminated structure, as hereinafter described.

It is also my purpose to provide a method by which my printing plates may be manufactured by a simple molding operation at a great saving of time, labor and cost when compared with the preparation of electrotypes, stereotypes and similar metal plates.

Furthermore, by the practice of my method and the utilization of the materials herein set forth, the printing plates may be molded so as to accurately reproduce the finest details which appear in an original such as a type body, etching or the like, or an original printing body made up of a combination of type, half-tone and etching.

With the above recited objects and others of a similar nature in view, my invention consists in the construction, combination and arrangement of parts, and in the improved method set forth in and falling within the scope of the appended claims.

In the accompanying drawing:

Figure 1 is a plan view of a molded phenolic printing plate;

Fig. 2 is a view in end elevation showing the plate of Fig. 1 united with a fibrous back such as a block of wood;

Fig. 3 is a view in cross section showing the plate blank material, composed of a layer of plastic phenolic condensation product and a backing sheet of fabric in conjunction therewith, said view also illustrating the backing to which the plate may be united under pressure;

Fig. 4 is a cross sectional view taken through a mold box containing a metal face matrix and showing the manner of molding the printing plate from the phenolic condensation blank and the fabric sheet of Fig. 3;

Fig. 5 is a conventional view in elevation of a press such as may be used for molding of the printing plate under heat and pressure, said view showing the press open and the molding box and the contained plate on the bed thereof; and Figs. 6 to 10, inclusive are cross sectional views showing modified forms of plates.

Before entering into a detailed description of my invention, I will briefly state that in the manufacture of my molded plate I may use any suitable apparatus for applying heat and pressure, such for example as that illustrated in Fig. 9 of my aforesaid application, Serial No. 784,456, and of which apparatus I have herein merely conventionally shown the press. I may also employ any suitable matrix or mold, such for example as that set forth in my application, Serial No. 427,832 filed December 2, 1920, as a division of my aforesaid application, Serial No. 784,456, and which matrix is shown in cross section in Fig. 4 herein, as located in a molding box. This molding box is also shown in the aforesaid earlier application Serial No. 784,456. Therefore, this invention is not directed to features of the apparatus, nor to the molding box, nor to the matrix, but is applicable to improvements in the structure of the molded plate itself and to the method of making the same.

Referring now to the accompanying drawings in detail, and particularly to Fig. 4, wherein I have shown enough of the molding box to give a clear understanding of the operation of making the plate, the letter A indicates the molding box and B a printing plate matrix clamped therein and having a metallic molding face C. D indicates the lower platen or bed of the press shown in Fig. 5 and E indicates the upper platen thereof, the press platens being shown in Fig. 4 as closed as in the operation of molding a plate.

In making the printing plate, I impose upon the metal face of the matrix a plate blank which is shown in Fig. 3 and comprises a layer 1 of a phenolic condensation product, such as redmanol, preferably having in conjunction therewith a filler or strengthening backing 2 of suitable material, such as fabric. The blank 1 may contain, as usual, a suitable filler, such as wood flour, and while being shown in sheet form, may also be in the form of a powder, if desired. After the blank has been positioned upon the matrix in the molding box, as shown in Fig. 4, a suitable plunger F may be superposed thereon and the assembled parts placed upon the lower platen D of the press, as shown in Fig. 5. The press is then closed and operated under a predetermined degree of temperature and under a suitable degree of pressure until the plate is molded as shown in Fig. 1 and hardened and set or baked to a permanent form. I have found a suitable pressure to range from 1000 to 3000 pounds, applied for about from five to twenty minutes and with a temperature ranging from 200 to 420 degrees Fahrenheit, according to the character of the work. After the plate has been properly molded and baked the press may be opened, the plunger F lifted and the plate removed from the matrix in the mold box.

In Fig. 1 the printing plate P is shown without the fabric backing sheet 2, and, therefore, this sheet 2 may be omitted or used as deemed desirable. When trimmed the article may be mailed for use as a printing plate itself or for use as an original in production of stereotypes, the character of my improved composition plate being especially adapted to the production therefrom of matrices for stereotypes; and it will be also noted that the material employed renders it capable of direct use as a matrix itself, being sufficiently heat-proof for the purposes of stereotyping, if the alloy used be not of a composition having too high a melting point, and my improved plate has such powers of resistance to jars and shocks that it can be transported without suffering the injuries which hinder the similar utilization of the ordinary flong matrix.

When the plate is to be used for printing purposes after mailing it may be secured to a backing block in the usual fashion, as for example by nails or clamps applied at the printing establishment of the consignee.

If, however, it is intended for use where mailing can be avoided and the weight is, therefore, unimportant, I have found that my improved plate can be formed conveniently in place upon its backing block, simply by applying a block of fibrous material, such as wood, such as is shown at 3 (Figs. 2, 3 and 6) to the back of the plate blank, under impression in the press, with the result that the constituent phenolic condensation product such as redmanol, under the heat and pressure employed, unites the plate and block in a unitary structure, nicely leveled and capable of withstanding the rough usage of the printing room, the phenolic condensation product penetrating the grain or pores of the backing block as indicated at 4 in Fig. 2.

It will be noted that in Fig. 3 I have shown the wooden block 3 positioned above the fabric layer 2 at the back of blank 1 of phenolic condensation product and which latter is to form the face or printing surface of the plate. In making the plate it is possible to include this filler fabric, for example of crinoline or linen, in the unitary structure and cement it to the block by the exudation of phenolic condensation product under heat and pressure, as will be readily understood, the fabric being sufficiently porous to permit this.

In Figs. 6 to 10 I have shown certain modified forms of printing plates.

In Fig. 6 the backing block 3 has cemented thereto as at 8, a printing plate having its phenolic body portion 9 faced with a metal surface as shown at 10.

In Fig. 7 the body of the plate, formed of phenolic condensation product indicated at 11, has embedded therein the fabric 12 to form the backing. If desired this fabric may be provided as a part of the plate blank, being incorporated therein prior to the impression of the blank against the matrix. This Fig. 7 also illustrates the application of a sheet metal printing face 13 intimately and firmly connected with the body of the blank during the molding operation. This connection can be effected by applying to the blank which is to form the body 11, a suitable fluid, or paste, or powder, such as a phenolic condensation product, which under heat and pressure will cause the metal face to adhere to the plate body.

In Fig. 8 the back of the printing plate, shown at 14 may be composed of a suitable material, such as felted fabric, or other substances may be used, such as felt paper, and other felting fiber, these being more or less foraminous or porous, so that there is a considerable interpenetration of the phenolic condensation product of the plate body 16 which will result in the firm adherence of the backing to the body of the plate. In said Fig. 6 the face 15 of the printing plate, which is united with the phenolic body 16, is in the nature of a metallic printing surface, which may be applied by coating the matrix, prior to the plate molding operation, with a paste having a powdered metallic content, such as a metallic oxid, that will be transferred to the printing plate during the impression and molding of the latter and will be connected therewith as a metal facing in the form of a fine metal dust evenly distributed.

In Fig. 9 I show a laminated plate made up of one or more filler sheets or layers 17 of paper, felt or fabric, alternating with layers of the phenolic condensation product shown at 18. The laminated body may also have a metal facing shown at 19, and this structure provides a strong durable plate of considerable rigidity and free from the tendency to warp or blister.

In Fig. 10 I have shown another modified form of plate wherein hard polished sheets 20 composed of a suitable filler and phenolic condensation product alternate with layers of the phenolic condensation product shown at 21, and the composite sheet thus formed is faced or coated with a thin paste at one side as at 22, this thin paste, which is to form a printing face being subsequently impressed with type or other character and at the same operation welded to the plate composed of the layers 20 and 21.

It will be understood that the constituent parts of the various plates, i. e., the fiber, phenolic and metal layers or laminations are united under heat and pressure as described. Furthermore, while I have herein shown and described uniting the phenolic plate with a wood base or backing by the inherent penetrating quality of the plastic condensation product, I do not claim the same specifically herein, as claims specific to this particular form of the invention are embodied in my divisional application, Serial No. 427,832 filed Dec. 2, 1920.

What I claim is:

1. A composite printing plate comprising a printing face section of a hard synthetic resin provided with printing characters, and a non-resinous, non-flowing backing section permanently united with said face section.

2. A composite printing plate comprising a printing face section of a hard infusible phenolic material provided with printing characters, a non-flowing backing section, and means for permanently uniting the two sections in an integral structure.

3. A composite printing plate comprising a printing face section of hard phenolic material provided with printing characters, and a non-phenolic backing section of yielding material permanently united with the face section.

4. A composite printing plate comprising a printing face section of hard synthetic resinous material, and a fibrous backing section, united in an integral structure with said face section.

5. A composite printing plate having a backing including a layer of fibrous material, and a printing plate of hard synthetic resin having printing characters formed thereon, and united with the backing by the penetration of a portion of the synthetic resin into said backing.

6. A composite printing plate comprising united laminations of hard synthetic resin, fibrous material, and metal, one face of said plate having printing characters formed thereon.

7. A composite printing plate comprising a laminated body including a plurality of layers of hard synthetic resinous material alternating with a plurality of strengthening or filler sheets embodying non-resinous material, one side of said laminated sheet being provided with a printing face.

8. The herein described method of making a printing plate which comprises placing a blank of plastic synthetic resin against the molding face of a matrix, placing a layer of non-flowing material against the plastic back and then subjecting the assembled parts to heat and pressure to mold and harden the plastic material and form a printing face thereon and unite the same in an integral structure with a layer of non-flowing material.

9. The herein described method of making a printing plate which comprises placing a blank of plastic synthetic resin against the molding face of a matrix, placing a layer comprising fibrous material against the plastic blank, and then subjecting the assembled parts to heat and pressure to mold and harden the plastic material and form a printing face thereon and to unite the same in an integral structure with the fibrous layer.

10. The herein described method of making a printing plate which comprises forming a laminated body of layers of plastic synthetic resin, fibrous material and metal, and then subjecting such laminated structure to heat and pressure against a matrix to unite the layers in an integral body and to provide such body with a printing face.

Signed at Philadelphia, in the county of Philadelphia and State of Pennsylvania, this 22nd day of November, A. D. 1920.

WILLIAM J. YEOELL.